Patented Jan. 28, 1936

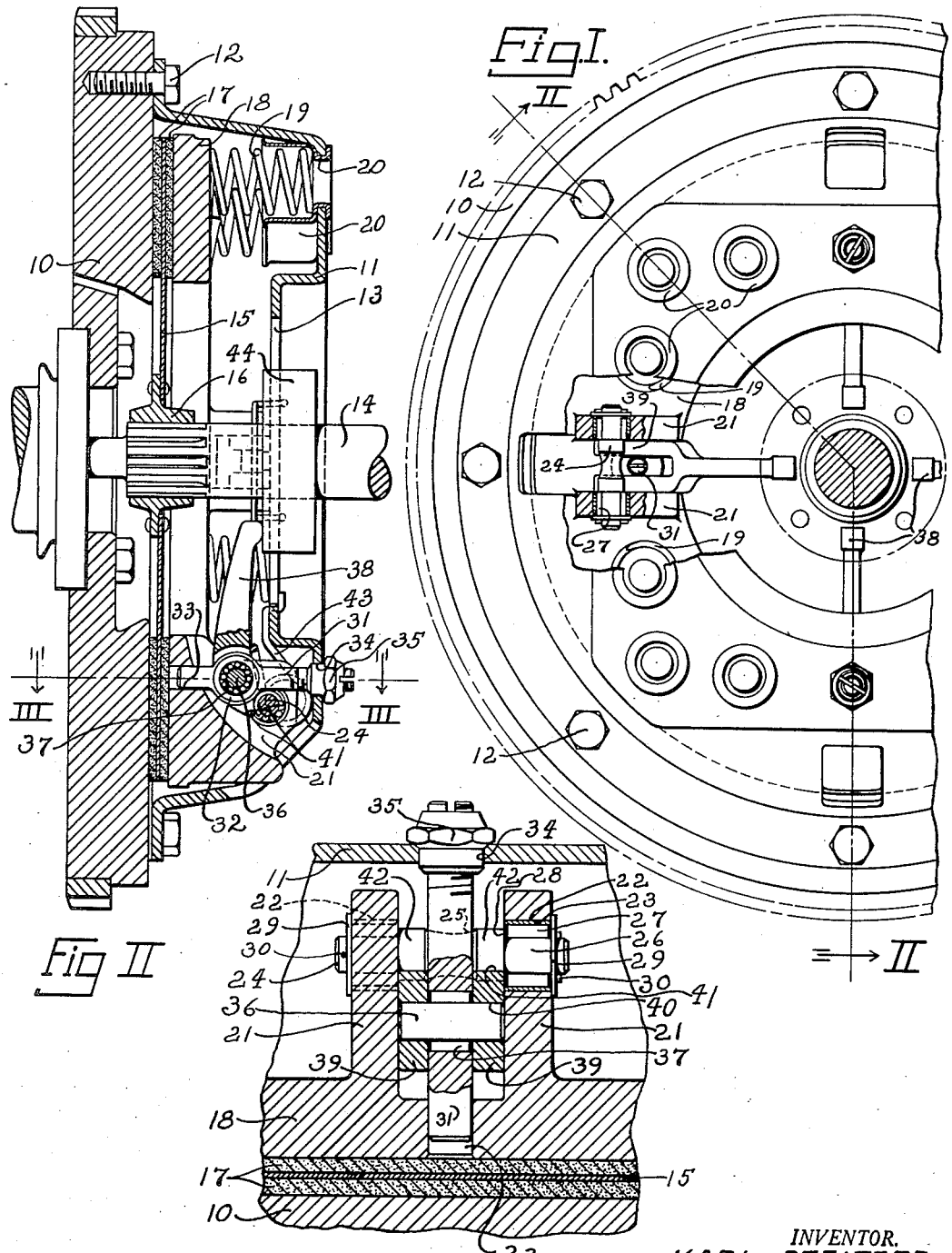

2,029,187

UNITED STATES PATENT OFFICE 2,029,187

CLUTCH MECHANISM

Karl Pfeiffer, Detroit, Mich., assignor to Chrysler Corporation, Detroit, Mich., a corporation of Delaware Application March 19, 1932, Serial No. 599,859

5 Claims. (Cl. 192—68)

This invention relates to clutch operating mechanism, and particularly to improved clutch disengaging apparatus of the character embodied in vehicle main clutches.

The magnitude of the force which clutch disengaging apparatus is called upon to apply is determined by the strength and compression of the springs that normally hold the clutch disc in contact with the driving or driven clutch members. The force required of the springs of a clutch in a system of given power is in turn determined largely by the contacting areas of the friction surfaces on the clutch disc. In practice, there is a tendency to reduce the dimensions of vehicle clutch mechanism including the clutch disc thereof, and to increase the unit pressure applied on the disc by strengthening the springs. This condition increases the foot pressure required to disengage the clutch and causes the contacting surfaces of moving parts of the clutch disengaging apparatus to be subjected to extremely high pressures. As these contacting surfaces cannot be lubricated in the dry clutches conventionally used in vehicles, they readily become scored to such an extent that they bind and render it necessary for excessive foot pressure to be applied on the clutch pedal in order to disengage the clutch.

The main objects of this invention are to provide improved clutch disengaging apparatus for overcoming the compression of the clutch springs; to provide parts in apparatus of this kind which will not score or otherwise wear each other under the pressure acting thereon during clutch disengaging operations; to provide rolling contact elements between substantially all contacting relatively movable parts of the clutch disengaging apparatus so as to obviate friction and permit the strength of the clutch springs to be increased and the area of the friction surfaces of the clutch discs to be decreased without excessively increasing the foot pressure required of an operator to disengage the clutch; and to provide simple and inexpensive apparatus of this character having anti-friction bearings which do not require lubrication and which may be conveniently assembled in the clutch unit.

An illustrative embodiment of my invention is shown in the accompanying drawing, in which:

Fig. 1 is a fragmentary elevational view, partly in section, of a clutch which embodies my invention.

Fig. 2 is a longitudinal sectional view taken on the line II—II of Fig. 1.

Fig. 3 is an enlarged fragmentary transverse sectional view taken on the line III—III of Fig. 2 showing the structure of my improved clutch disengaging apparatus in detail.

In the form shown, my improved clutch disengaging apparatus is embodied in a clutch of the type used in vehicles. The driving member of the clutch includes a flywheel 10 having a casing 11 mounted on one side by bolts 12. The end wall of the casing is provided with a central opening 13 through which extends the driven member 14 which, in a vehicle, corresponds with the driving shaft of the transmission, or with the driving member of any other mechanism. A clutch disc 15 located within the housing 11 and adjacent the flywheel 10 is non-rotatably fixed to the driven member 14 by a collar 16 having splines thereon meshed with splines on the driven member. The clutch disc is provided on its respectively opposite sides with rings of friction material 17 which are engageable with the side face of the flywheel and with a pressure ring 18 which is carried by the casing 11 and concentrically located with respect to the axes of the driving and driven members. A plurality of circumferentially spaced coil springs 19, having their outer ends seated in spring retaining cups 20 carried by the casing 11, bear between the latter and the pressure ring 18 so as to normally firmly hold the friction rings 17 of the clutch disc in engagement with the flywheel 10 of the driving member.

In order to disengage the clutch it is necessary to retract the pressure ring 18 against the action of the springs 19. This is accomplished by clutch disengaging apparatus which includes a plurality of substantially identical, circumferentially spaced units, of which only one is illustrated in detail in the accompanying drawing. Each unit of the clutch disengaging apparatus is associated with a pair of lugs 21 formed integral with the pressure ring and extending into the interior of the casing 11. These lugs are provided with registering openings 22 in each of which is mounted a bushing 23. A rotatable pin 24 having a grooved intermediate section 25 extends between the lugs 21. This pin has reduced end portions 26 which are received in the openings 22 and journaled therein within a series of rollers 27 circumferentially arranged about the inner periphery of the bushing 23. The rollers 27 are held against endwise displacement by shoulders 28 located at the inner extremities of the reduced end portions 26 of the pin, and washers 29 on the outer ends of the reduced end portions 26 which are held in place by cotter pins 30.

A bolt-like support 31 having an enlarged apertured intermediate portion 32 is slidably mounted in registering openings 33 and 34 in the pressure ring 18 and end wall of the casing 11, respectively. Threaded on the external end of the support 31 is an adjustable nut 35 which limits inward movement of the support and predetermines the position thereof. A pin 36, which is slightly shorter in length than the space between the adjacent faces of the lugs 21 extends through the aperture of the enlarged intermediate portion of the support 31 and is rotatably supported therein by a series of rollers 37 which are circumferentially arranged about the inner periphery of this aperture.

Mounted on the pin 36 is a clutch releasing lever or finger 38 having a bifurcated outer end portion 39 located between the lugs 21. The support 31 extends between the side members 39 of the bifurcated end portion of the lever 38, and the end portions of the pin 36 are received in apertures 40 formed in these side members. The side members 39 of the bifurcated end of the lever 38 restrict the opening in the enlarged portion 32 of the support 31 sufficiently to hold the rollers 37 against endwise displacement. The outer ends of the side members of the bifurcated end of the lever 38 have cam faces 41 which register with cylindrical peripheral portions 42 on the pin 24. A spring 43 bears between the end wall of the casing 11 and the lever 38. This spring holds the support 31 against outward movement relative to the casing 11 and it tends to rotate the lever 38 in a counter-clockwise direction, as viewed in Fig. 2, thereby holding the cam faces 41 in engagement with the cylindrical portions 42 of the pin 24.

Slidably mounted on the driven member 14 is a collar 44 which, when shifted to the left, as viewed in Fig. 2, by conventional clutch operating mechanism (not shown), bears upon the inner end of the lever 38 and rotates the latter in a counter-clockwise direction, causing the pressure ring 18 to be cammed to a retracted position against the action of the springs 19 by the engagement of the cam faces 41 with the cylindrical portions 42 of the pin 24. The collar 44 operates simultaneously upon all of the units of the clutch disengaging apparatus in the above manner.

The pin 36 upon which the clutch disengaging fingers 38 are mounted, turns freely in the bearing provided by the rollers 37. The rolling contact between this pin and the supporting bolt 31 reduces frictional opposition to movement of the clutch disengaging finger and obviates scoring of the contacting surfaces of the movable parts under the terrific pressure to which such surfaces are subjected. The series of rollers 27 within which the cross pin 24 is journaled, permit free rotation of this pin while it is being acted upon by the cam faces 41 of the clutch disengaging lever 38. The free rolling contact between the pin 24 and the cam faces on the outer extremity of the lever 38 eliminates frictional binding between these parts, as well as prevents scoring and wearing thereof.

In general, the rolling contact provided between substantially all the parts of the apparatus materially reduces the foot pressure which has heretofore been required in order to disengage clutches of this character. The reduction in the foot pressure made possible by apparatus of this kind is particularly noticeable in the operation of clutches having comparatively strong clutch engaging springs, for the binding forces opposing relative movement of the parts of the clutch disengaging apparatus increase as the pressure applied on these parts is increased.

Although but one specific embodiment of my invention is herein shown and described, it will be understood that various changes in the size, shape, and arrangement of parts may be made without departing from the spirit of my invention, and it is not my intention to limit the scope other than by the terms of the appended claims.

What I claim is:

1. A clutch including driving and driven members, a clutch disc mounted on said driven member, a pressure ring shiftably mounted on said driving member, springs bearing between said pressure ring and said driving member normally retaining said disc in frictional engagement with said driving member, spaced lugs on said pressure ring, a support on said driving member extending between said lugs having an aperture registering with the sides thereof, a pin extending through said aperture having its extremities in close fitting relation to the adjacent sides of said lugs, rollers between the periphery of said aperture and said pin, a second pin extending into openings in said lugs, rollers in said lug openings rotatably supporting said second pin, and a bifurcated member mounted on said first mentioned pin having an arm on each side of said support restricting the ends of the aperture thereof and coacting with the second mentioned pin for retracting said pressure ring.

2. A clutch including a driving member having a casing fixed on one side, a driven member extending into said casing, a clutch disc on said driven member engageable with said driving member, a pressure ring slidably mounted in said casing, springs for urging said pressure ring against said clutch disc and normally holding the latter in frictional engagement with said driving member, spaced lugs on said pressure ring having registering apertures therein, a rolling contact bearing in each of said apertures, a pin journaled in said bearings, a support slidably mounted in registering apertures in said casing and pressure ring respectively having an adjustable member on one end for limiting inward movement thereof, a rotatable finger carried by said support and engageable with said pin for retracting said pressure ring against the action of said springs, and resilient means bearing between said casing and said finger normally retaining the latter in engagement with said pin and holding said support against outward movement relative to said casing.

3. A clutch including a driving member having a casing fixed on one side, a driven member extending into said casing, a clutch disc on said driven member engageable with said driving member, a pressure ring slidably mounted in said casing, springs for urging said pressure ring against said clutch disc and normally holding the latter in frictional engagement with said driving member, spaced lugs on said pressure ring having registering apertures therein, a rolling contact bearing in each of said apertures, a pin journaled in said bearings, a support slidably mounted in registering apertures in said casing and pressure ring respectively having an adjustable member on one end for limiting inward movement thereof and having an enlarged apertured intermediate portion, a rolling contact bearing in the aperture of said support, a pin journaled in the latter bearing, a finger mounted on the latter pin having rolling contact with the first mentioned pin for retracting said pressure ring against the action of said springs, and resilient means bearing between said casing and said finger normally retaining the latter in engagement with said first mentioned pin and holding said support against outward movement.

4. A clutch including driving means and a driven member, a clutch disc mounted on said driven member, a pressure ring shiftably mounted on said driving means, springs bearing between said pressure ring and said driving means normally retaining said disc in frictional engagement with said driving means, spaced lugs on said pressure ring having registering apertures therein, a rolling contact bearing in each of said apertures, a pin journaled in said bearings, and means including a rotatable finger mounted on said driving means and having rolling contact engagement with said pin for retracting said pressure ring against the action of said springs.

5. A clutch including driving means and a driven member, a clutch disc mounted on said driven member, a pressure ring shiftably mounted on said driving means, springs bearing between said pressure ring and said driving means normally retaining said disc in frictional engagement with said driving means, an abutment on said pressure ring, a shiftable clutch disengaging element, a support adjustably mounted on said driving means having an aperture in its intermediate portion, a pin extending through said aperture, rolling contact elements between the periphery of said aperture and said pin, and a bifurcated member mounted on said pin coacting with said shiftable clutch disengaging element and having an arm on each side of said support restricting the ends of the aperture of said support and engaging said abutment for retracting said pressure plate.

KARL PFEIFFER.